United States Patent
Affentranger, Jr. et al.

(10) Patent No.: US 11,848,548 B1
(45) Date of Patent: Dec. 19, 2023

(54) ENCLOSURE ASSEMBLY WITH HOUSING

(71) Applicant: SunRun Inc., San Francisco, CA (US)

(72) Inventors: Martin John Affentranger, Jr., Paso Robles, CA (US); Daniel Edward Ryan, Scotts Valley, CA (US)

(73) Assignee: Sunrun Inc., San Francisco, CA (US)

( * ) Notice: Subject to any disclaimer, the term of this patent is extended or adjusted under 35 U.S.C. 154(b) by 0 days.

(21) Appl. No.: 18/114,621

(22) Filed: Feb. 27, 2023

(51) Int. Cl.
*H02G 3/08* (2006.01)

(52) U.S. Cl.
CPC ............. *H02G 3/081* (2013.01); *H02G 3/088* (2013.01)

(58) Field of Classification Search
CPC .............................. H02G 3/081; H02G 3/088
USPC ........................................................... 174/50
See application file for complete search history.

(56) References Cited

U.S. PATENT DOCUMENTS

| | | | |
|---|---|---|---|
| 6,455,768 B2* | 9/2002 | Negishi | H05K 5/061 174/17 CT |
| 10,230,227 B1* | 3/2019 | Wade | H02G 3/14 |
| 10,505,354 B2 | 12/2019 | Wade et al. | |
| 10,594,121 B2* | 3/2020 | Yang | H02S 40/34 |
| 11,088,517 B1* | 8/2021 | Pelletier | H02G 3/083 |
| 11,152,889 B1 | 10/2021 | Affentranger, Jr. et al. | |
| 11,515,693 B2* | 11/2022 | Wade | H02G 3/081 |
| 11,515,831 B2 | 11/2022 | Affentranger, Jr. et al. | |
| 2019/0334333 A1* | 10/2019 | Wade | H02G 1/06 |
| 2020/0119533 A1* | 4/2020 | Wade | H02G 3/081 |
| 2022/0085585 A1* | 3/2022 | Wade | H02G 3/12 |
| 2022/0221195 A1 | 7/2022 | Affentranger, Jr. et al. | |
| 2022/0239082 A1* | 7/2022 | Uebelhoer | H02G 3/088 |
| 2023/0043327 A1* | 2/2023 | Wade | H02G 3/10 |

\* cited by examiner

*Primary Examiner* — Timothy J Thompson
*Assistant Examiner* — Michael F McAllister
(74) *Attorney, Agent, or Firm* — Kramer Levin Naftalis & Frankel LLP (57) ABSTRACT

Enclosure assemblies employed in electrical installations, including those employed in solar power installations, which conform to NEMA 3R type rating defined by National Electrical Manufacturers Association ("NEMA") are disclosed. In some embodiments, a base of a housing of an enclosure assembly having a seal-receiving groove, fastener retainers, fastener walls, a moisture diverter, attachment points; and conductor pass-through apertures is disclosed. In some embodiments, a base of a housing of an enclosure assembly having a forward portion with a forward fastener retainer and forward attachment points; an aft portion of the base having an aft fastener retainer and aft and attachment points, the groove located between the forward and aft portions, a moisture diverter located between the forward and aft portions; and drainage channels encompassing the forward and aft portions is disclosed. In some embodiments, a method for pre-positioning a fastener in a housing of an enclosure assembly is disclosed.

7 Claims, 13 Drawing Sheets

Top View

Top View

FIG. 2A

Bottom View
FIG. 2B

FIG. 2C

FIG. 2D (Looking Forward)
FIG. 3A (Looking from Left)
FIG. 3B (Looking Aft)

FIG. 3C (Looking from Right)

Bottom View

FIG. 5F

ENCLOSURE ASSEMBLY WITH HOUSING

BACKGROUND

Building-mounted structures are typically secured to a building surface with one or more fastening devices. Such devices often penetrate the building surface in order to adequately secure the structure to the building. For example, solar power installations may be secured to rooftop structures by penetrating the roof surface with screws, bolts, or other types of fasteners suitable to perform the job. Also, solar power installations employs electrical junctions boxes ("jboxes" or singularly, "jbox") that provide an enclosed housing for conductors or wiring used for the solar power installations to shield the conductors from rain and other environmental conditions which may be hazardous if conductors are exposed. Often times, fasteners employed to secure the jboxes to the installation surface may penetrate the installation surface; penetrating the installation surface, however, can lead to various adverse issues including the ingress of moisture such as rain into the underlying structure supporting the surface installation.

The National Electrical Manufacturers Association ("NEMA") has defined a rating scale known to those skilled in the art as "NEMA" ratings. It provides an industry standard to provide an easy way to evaluate how well the jbox protects against environmental hazards such as rain, snow, and sleet from which moisture could find itself within the jbox. There are many types of NEMA enclosures, each designed to a NEMA rating. For instance, a jbox designated with a NEMA 3R type rating is weather-resistant to protect against falling dirt, weather hazards of rain, snow, and sleet, an is undamaged by a formation of ice.

SUMMARY

Embodiments of the inventive concepts disclosed herein are directed to jbox assemblies employed in solar power system installation on surfaces, such as, but not limited to, composition shingle roofs. Each jbox assembly employs sealing technology for protecting conductors that enter the jbox assembly from underneath with, for example, of chemical flashing to create a weatherproof seal while using employing mechanical flashing outside of the jbox. The use of the enclosure assembly disclosed herein improve protection of wiring from the environmental hazards.

In one aspect, embodiments of the inventive concepts disclosed herein are directed to a base of a housing of an enclosure assembly having a seal-receiving groove extending downwardly from a lower surface; fastener retainers with support walls extending through apertures; fastener walls extending downwardly from the lower surface; a moisture diverter extending upwardly from the upper surface; attachment points extending above the upper surface; and conductor pass-through apertures extending between the upper surface and the lower surface.

In a further aspect, embodiments of the inventive concepts disclosed herein are directed to a base of a housing of an enclosure assembly having a forward portion with a forward fastener retainer and forward attachment points; an aft portion of the base having an aft fastener retainer and aft and attachment points, a seal groove encompassing conductor pass-through apertures located between the forward and aft portions, a moisture diverter located between the forward and aft portions; and drainage channels encompassing the forward and aft portions.

In a further aspect, embodiments of the inventive concepts disclosed herein are directed to method for pre-positioning a fastener in a housing of an enclosure assembly by positioning a threaded fastener in an opening of a fastener retainer of a housing and applying a tightening force to the threaded fastener until the threaded fastener is supported in-place between first support walls solely by a frictional engagement between the threaded fastener and the support walls, where the fastener retainer includes support walls extending inwardly within an aperture. In some embodiments, wherein the support walls further extend upwardly from a lower surface of the housing and extending past an upper surface of the housing.

BRIEF DESCRIPTION OF THE DRAWINGS

For a fuller understanding of the inventive embodiments, reference is made to the following description taken in connection with the accompanying drawings in which.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
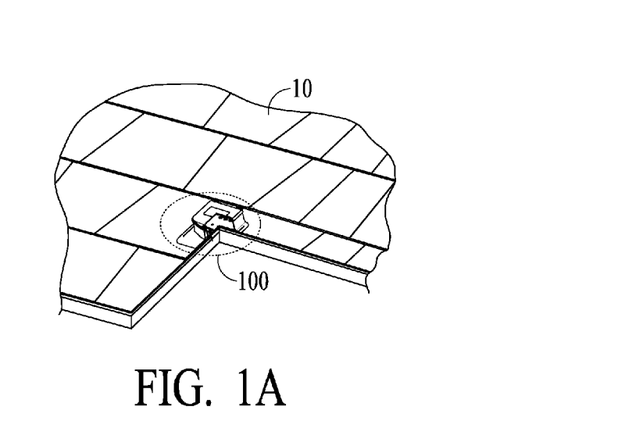
FIG. 1A illustrates an enclosure assembly secured to an installation surface, in accordance with some embodiments.
Figure 1B:
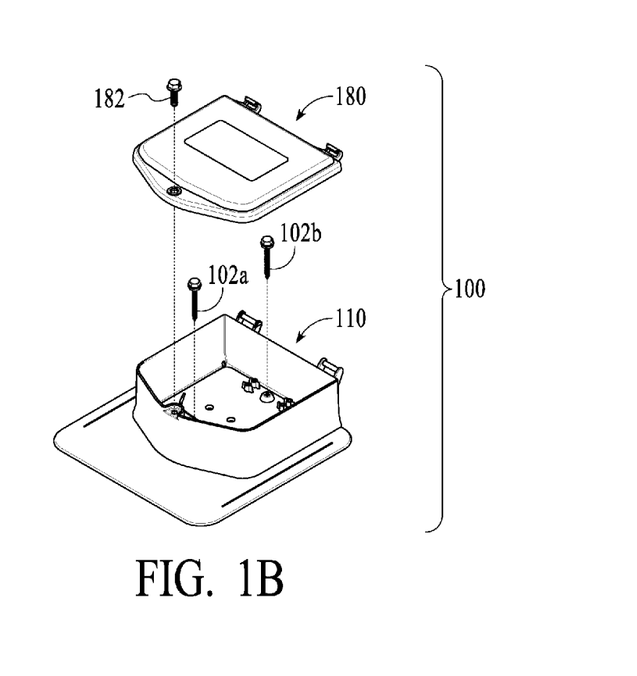
FIG. 1B illustrates an exploded, isometric view of the enclosure assembly, in accordance with some embodiments.

FIGS. 1A-1B illustrate an enclosure assembly 100 mounted on an installation surface 10 providing a 3R-type enclosure by enabling a direct pass-through of wiring in a photovoltaic (PV) array as discussed in detail below, where housing 110 is mounted on installation surface 10 with fasteners 102*a* and 102*b*, and cover 180 is fastened to housing 110 with a fastener 182.

Figure 2A:
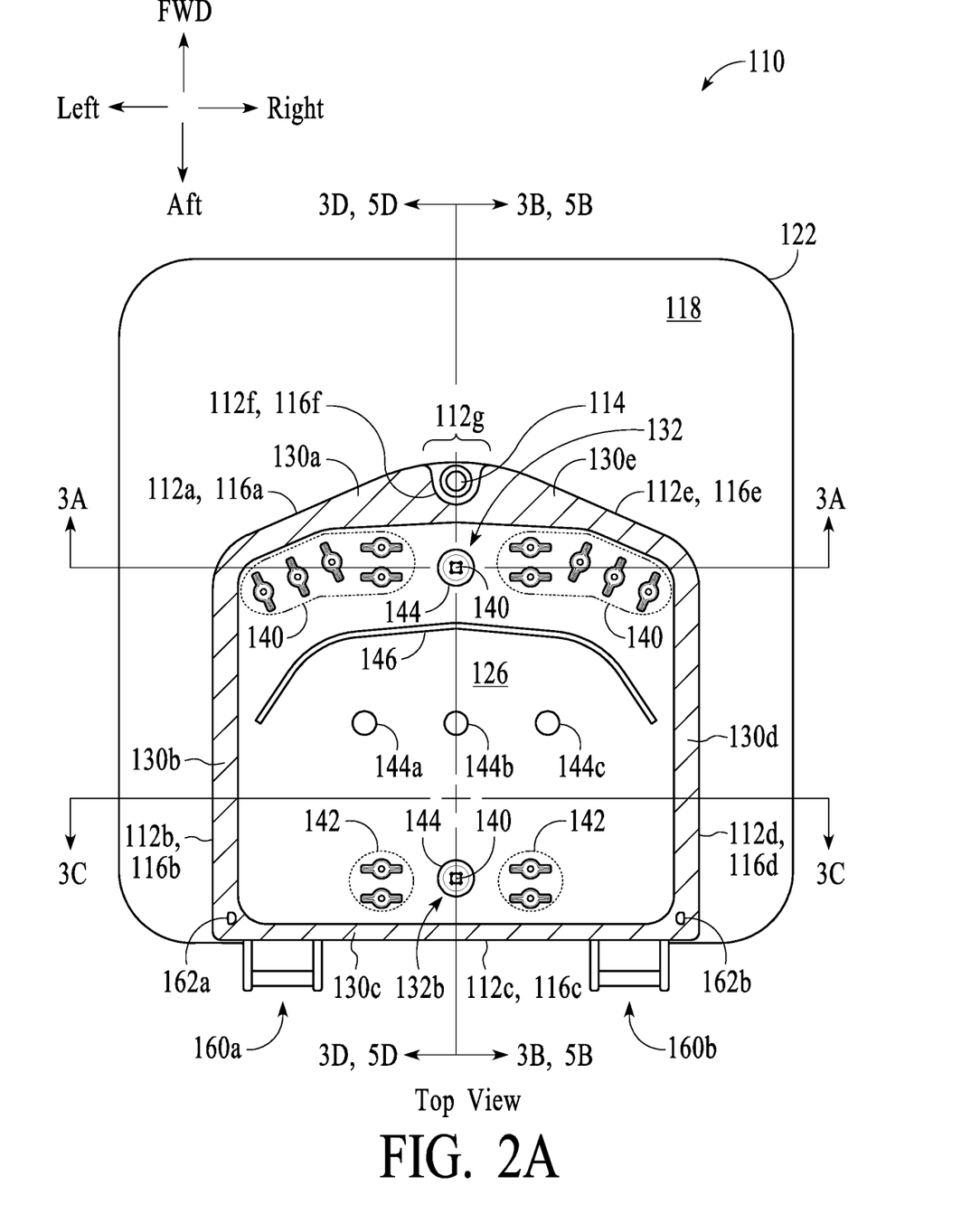
FIGS. 2A-2B respectively illustrate top and bottom isometric views of a housing of the enclosure assembly, in accordance with some embodiments.
Figure 2B:
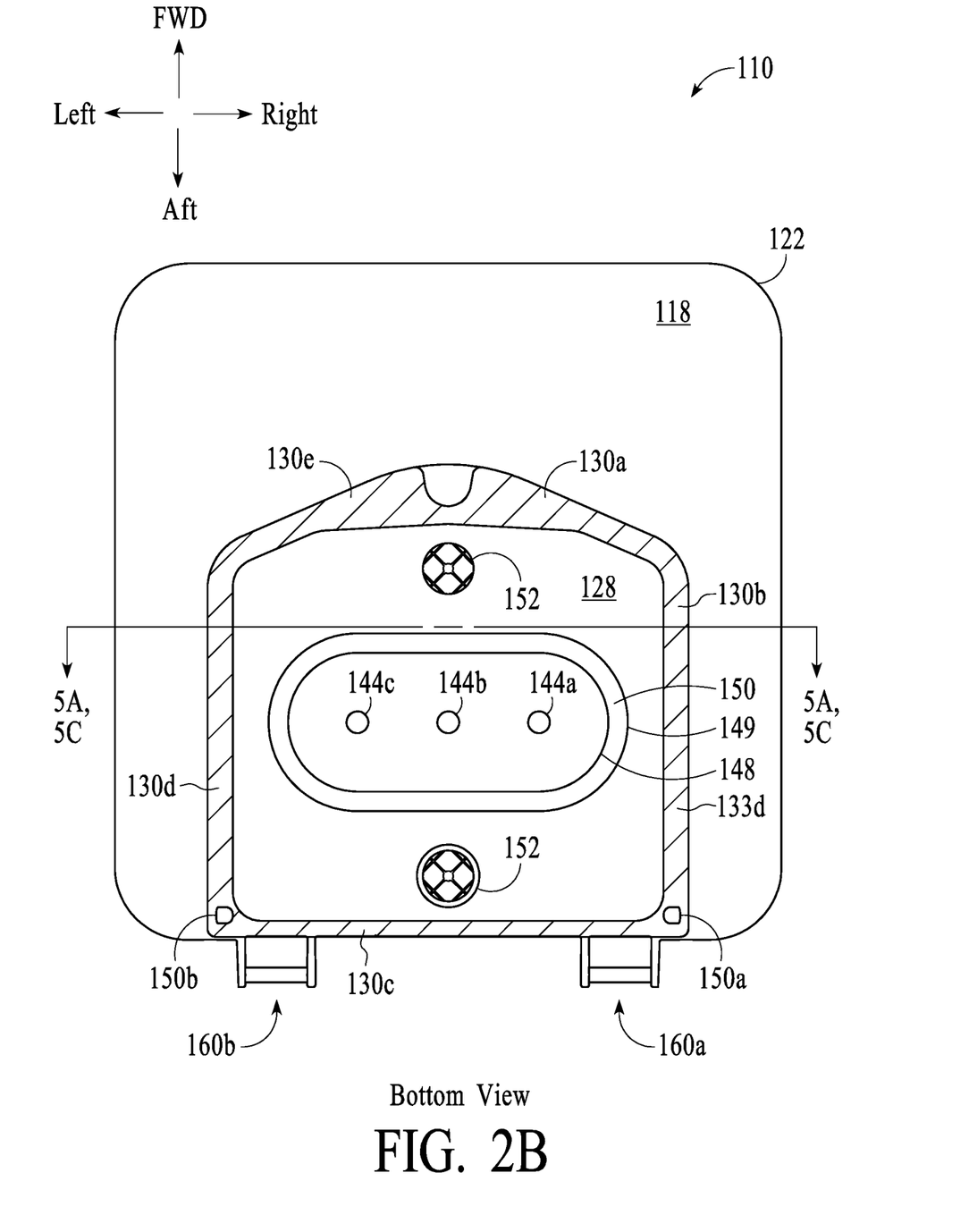
Figure 2C:
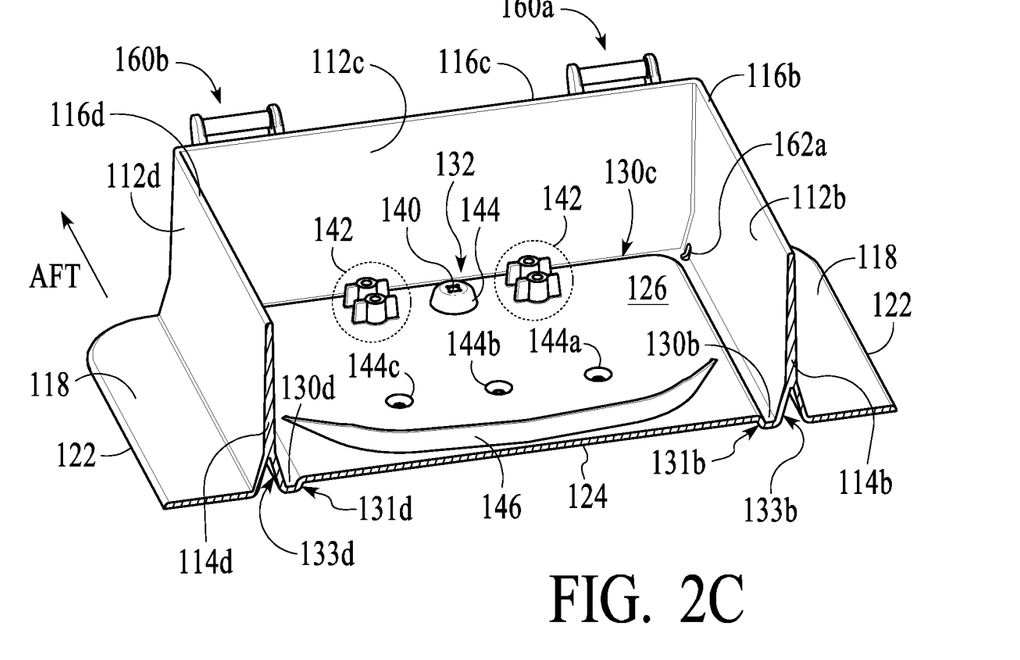
FIGS. 2C-2D respectively illustrate aft and forward isometric cross-sectional side views of the housing, in accordance with some embodiments.
Figure 2D:
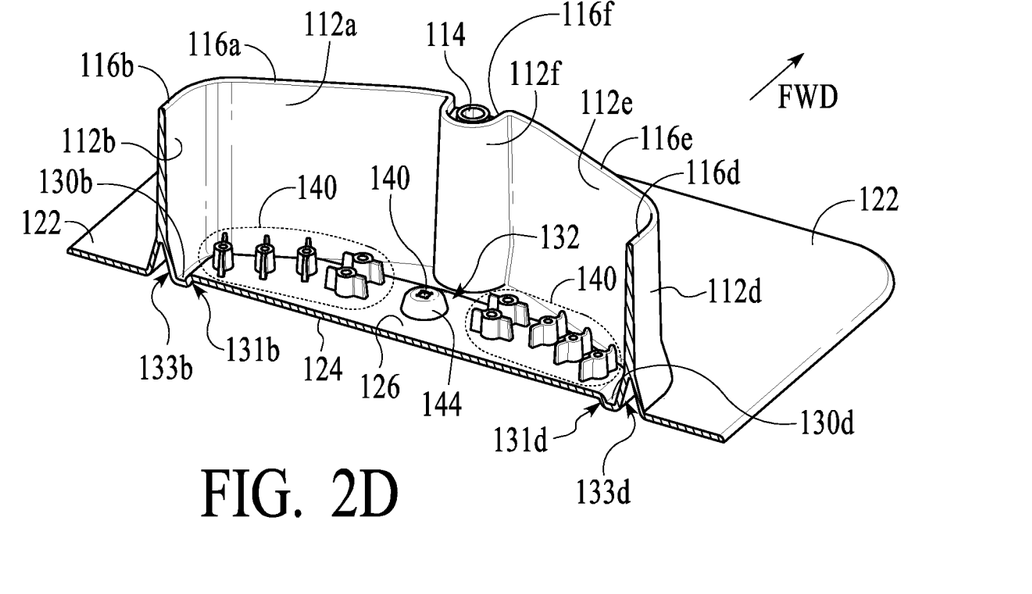
Figure 3A:
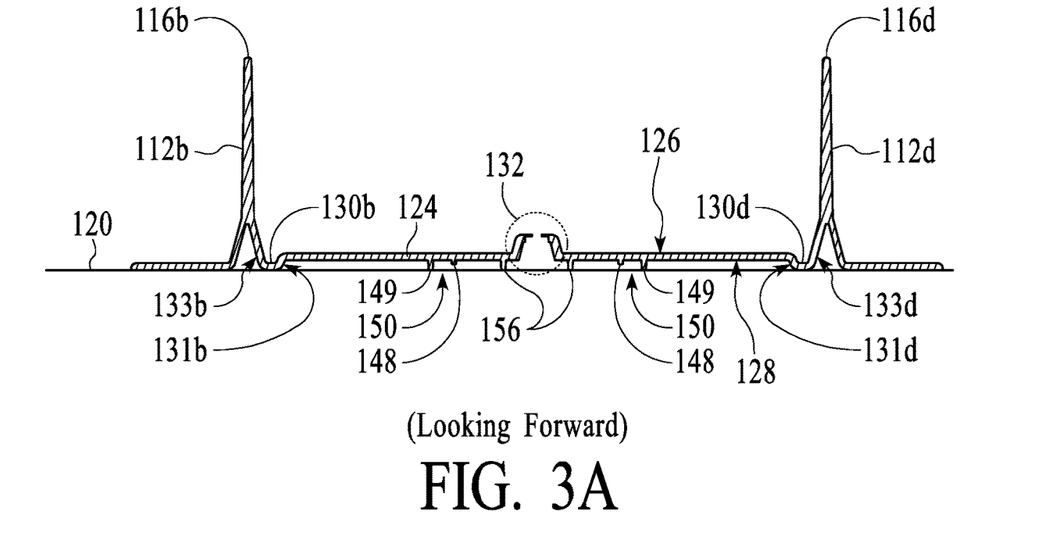
FIGS. 3A-3D respectively illustrate slices of side views of the housing, in accordance with some embodiments.
Figure 3B:
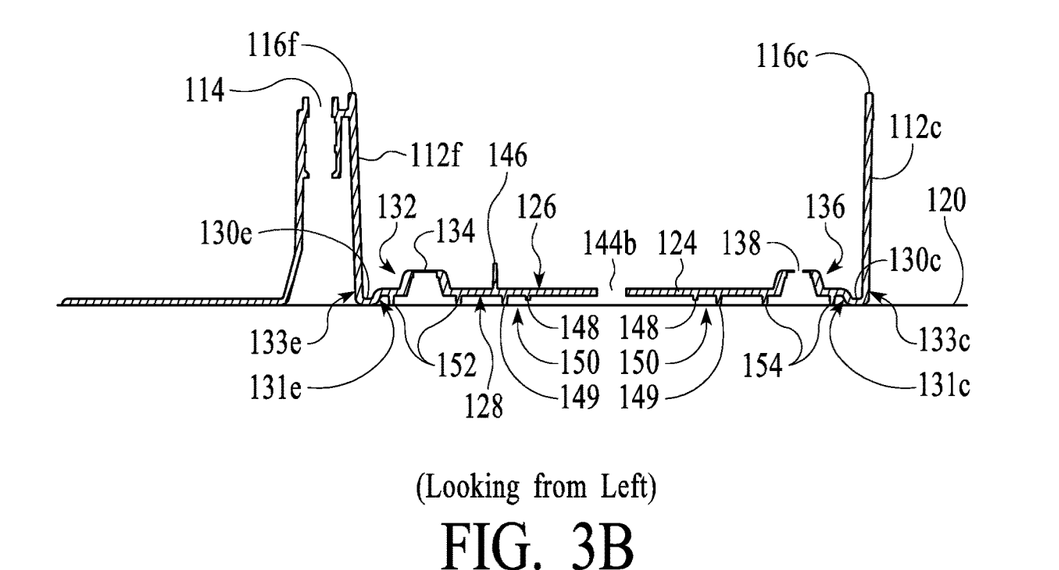
Figure 3C:
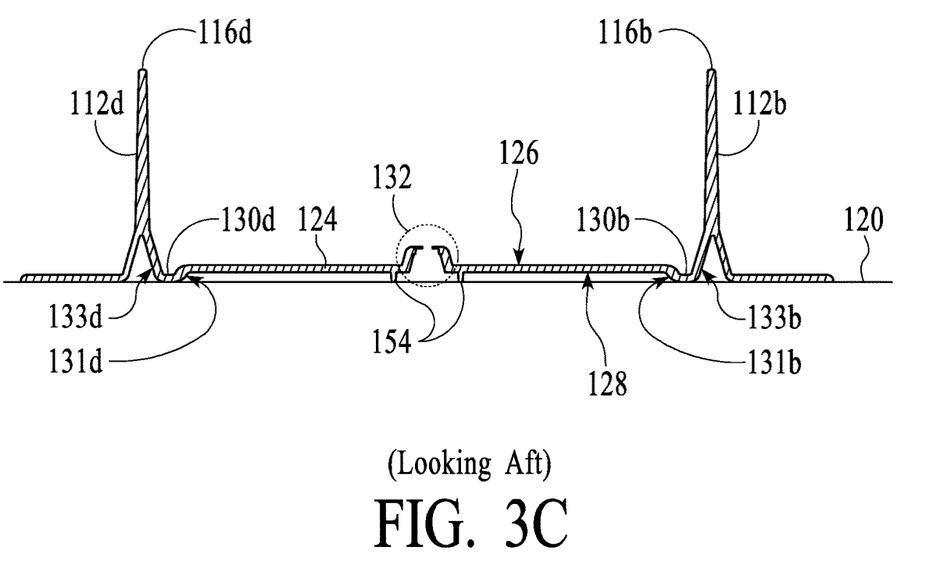
Figure 3D:
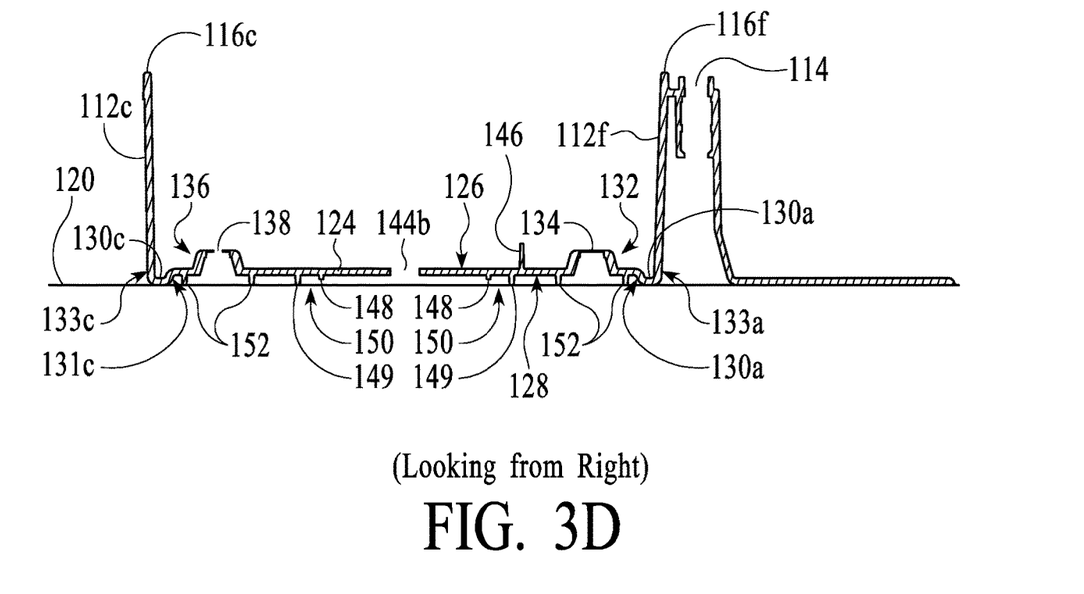
Figure 4A:
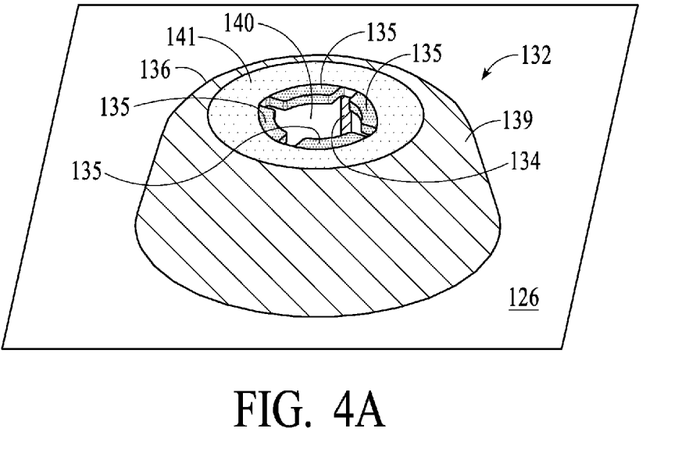
FIGS. 4A-4B respectively illustrate respective top and bottom isometric views, in accordance with some embodiments.
Figure 4B:
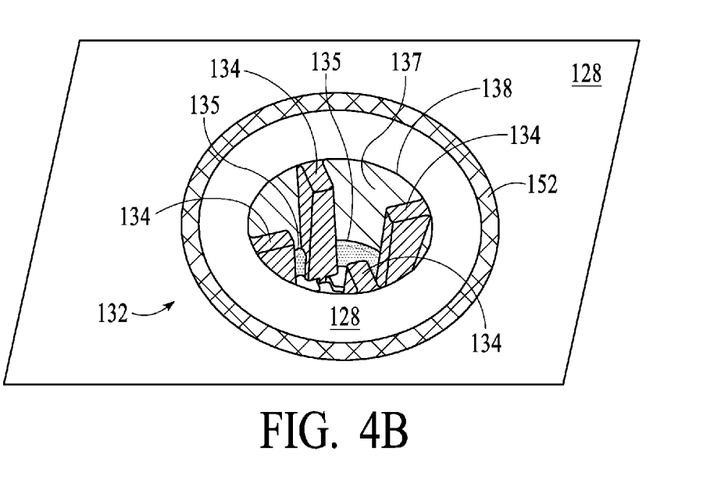
Figure 5A:
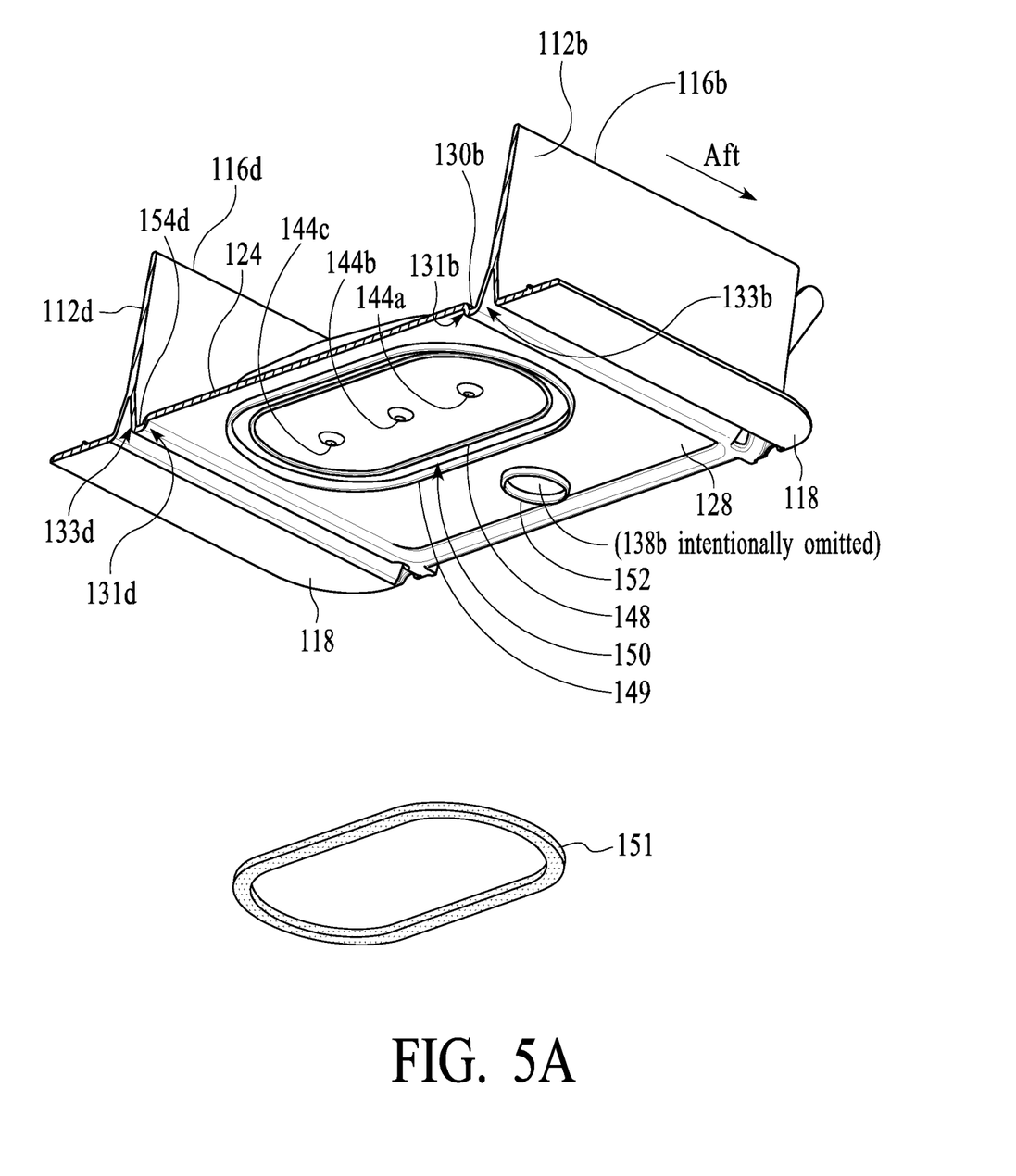
FIG. 5A respectively illustrates a bottom isometric view of the housing, in accordance with some embodiments.
Figure 5B:
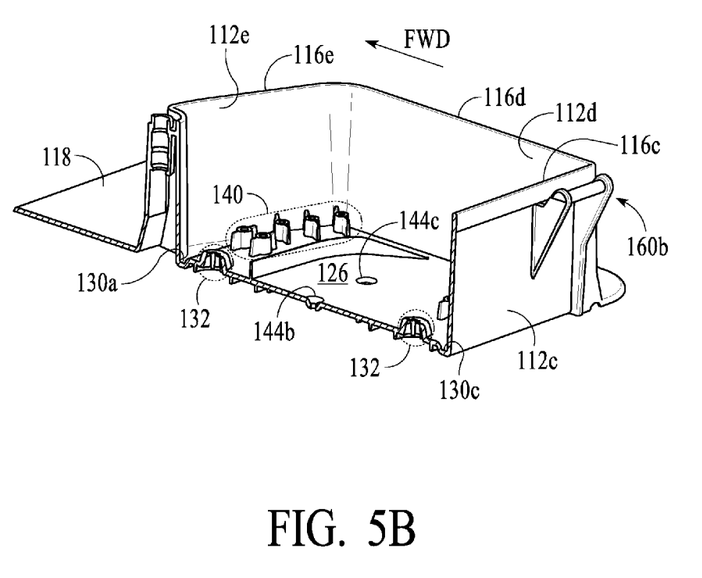
FIG. 5B respectively illustrates a top isometric view of the housing, in accordance with some embodiments FIG. 5C respectively illustrates a bottom isometric view of the housing, in accordance with some embodiments.
Figure 5C:
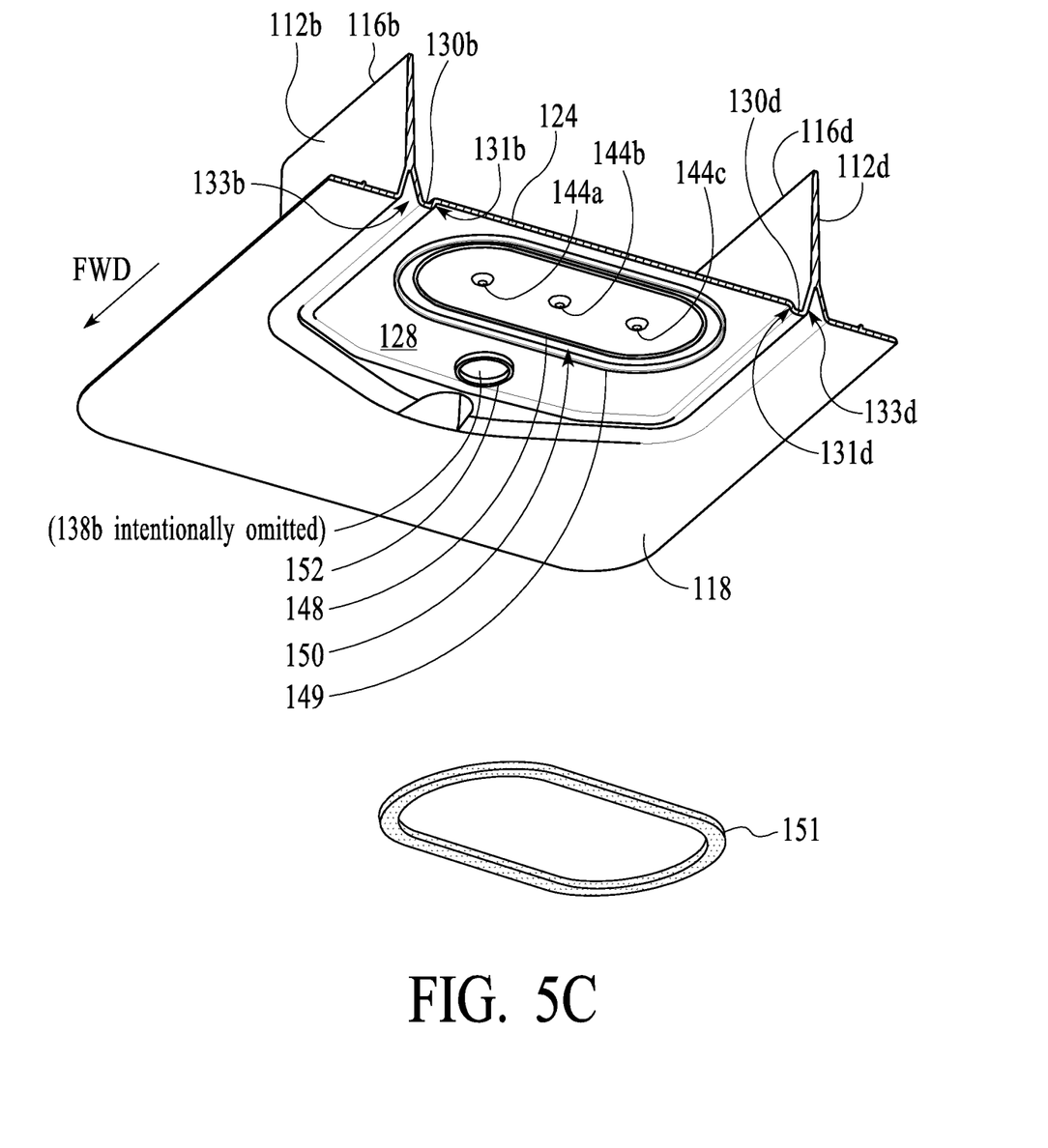
Figure 5D:
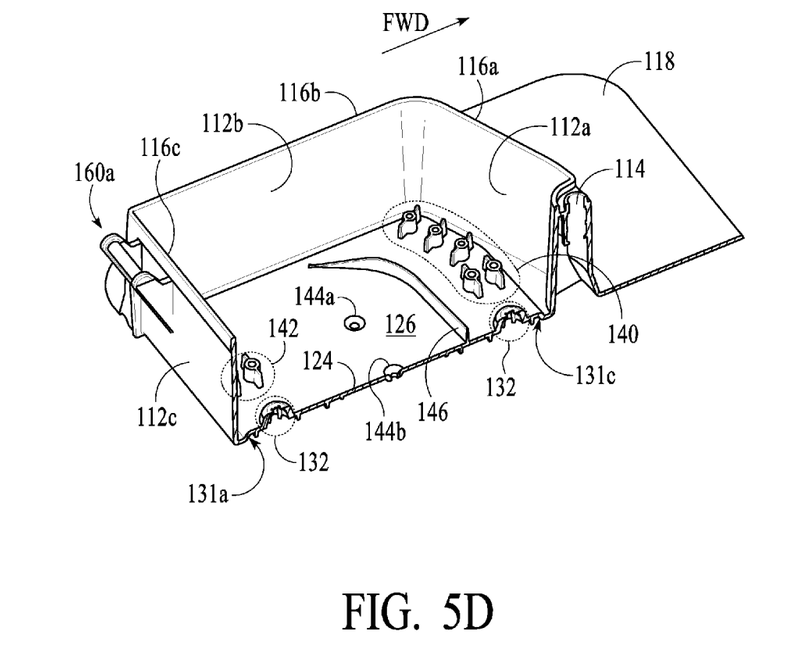
FIG. 5D respectively illustrates a top isometric view of the housing, in accordance with some embodiments.
Figure 5E:
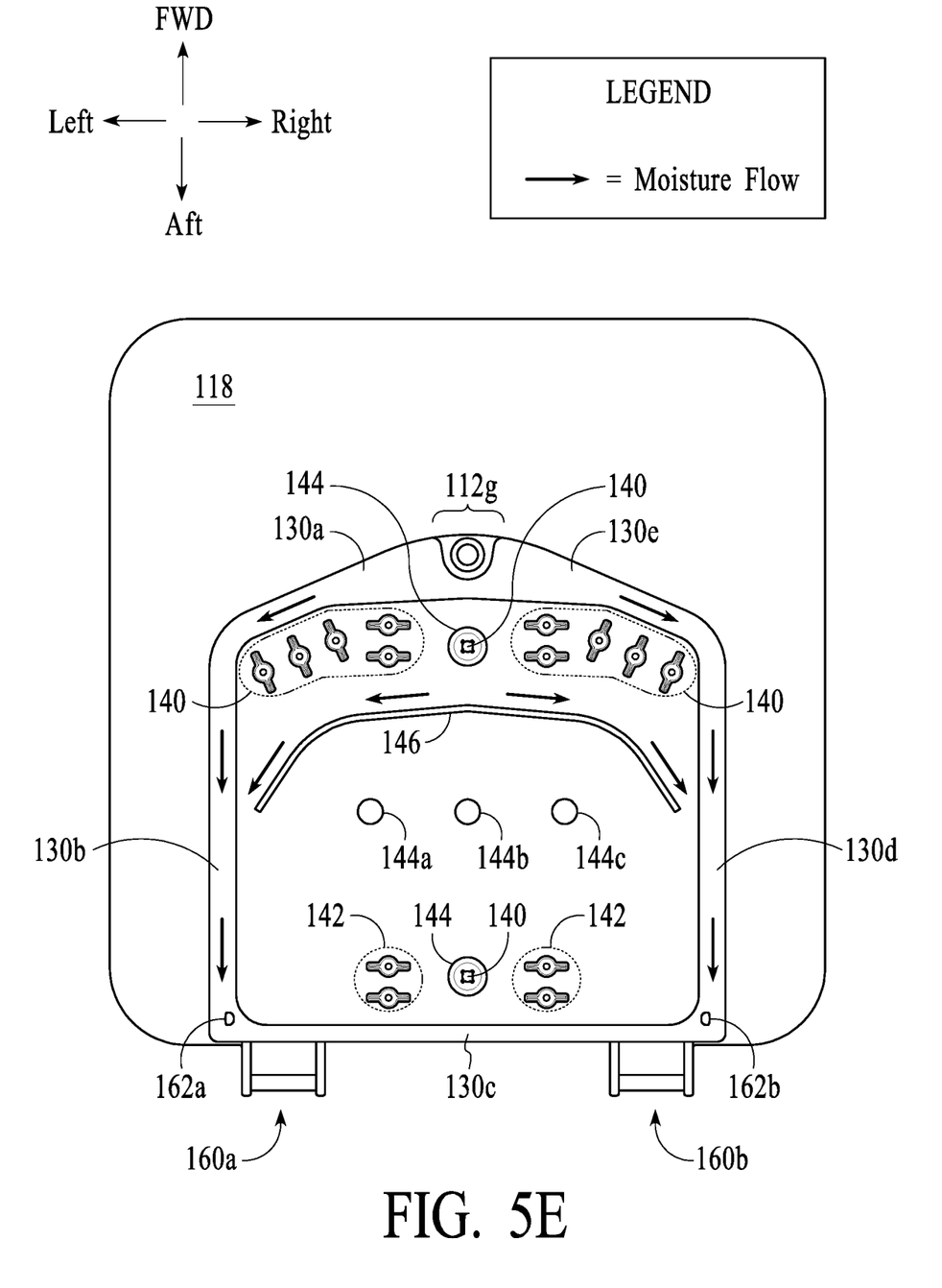
FIG. 5E respectively illustrates a top view of moisture flow within the housing, in accordance with some embodiments.

FIGS. 2A-5E, inclusive, illustrate multiple orientations of housing 110. FIGS. 2A-2B illustrate top and bottom perspective views, respectively; FIGS. 2C-2D illustrate aft and forward isometric cross-sectional side views, respectively; FIGS. 3A-3D illustrate slices of side views as shown (attachment points 140 intentionally excluded); FIGS. 4A-4B illustrate top and bottom isometric views, respectively; FIG. 5A illustrates a bottom isometric view; FIG. 5B illustrates a top isometric view; FIG. 5C illustrates a bottom isometric view; FIG. 5D illustrates a top isometric view; and FIG. 5E illustrates a top view of moisture flow to drainage apertures 162a and 162b allowing an egress of moisture from housing 110 when a forward end of housing 110 is mounted above an aft end of housing 110.

Enclosure assembly 100 includes a perimeter defined by a left forward sidewall 112a with distal end 116a; a left sidewall 112b with distal end 116b; an aft sidewall 112c with distal end and 116c; a right sidewall 112d with distal end 116d; and a right forward sidewall 112e with distal end 116e. A forward inner wall 112f with distal end 116f extends inwardly between left forward sidewall 112a and right forward sidewall 112e; along with portions of left and right forward sidewalls 112g, respectively, forward inner wall 112f enclose aperture 114 extending downwardly from distal ends 116a, 116e, and 116f, where aperture 114 is configured to threadably engage fastener 182 when cover 180 is mounted on housing 110. Flashing 118 extends outwardly and downwardly from sidewalls 112a-112e to horizontal reference plane 120; then, flashing 118 extends outwardly and along horizontal reference plane 120 until reaching a flashing perimeter 122. In some embodiments, horizontal reference plane 120 may be contiguous with the installation surface 10 upon which enclosure assembly 100 and/or flashing 118 are installed.

It should be noted that, although the disclosures herein are drawn to enclosure assembly 100 which a pentagonal shape, enclosure assembly 100 may be any shape (including circular with one continuous sidewall) that may facilitate a flow of moisture within the housing 110 to one or more drainage apertures 162a and 162b as disclosed below Housing 110 includes a base 124 having an upper surface 126, a lower surface 128 located above, substantially parallel with, and non-coplanar to horizontal reference plane 120, and a perimeter formed with drainage channels 130a-130e which facilitate a direction of flow to drainage apertures 162a-162b of moisture found within housing 110 (the moisture flow provided by drainage channels 130a-130b and 130d-130e are shown in FIG. 5E); although not indicated, moisture flow from drainage channel 130c may be towards drainage apertures 162a or 162b, and dependent of the force of gravity and side-to-side levelness of housing 110 when mounted to installation surface 10. Drainage channels 130a, 130b, 130c, 130d, and 130e include inner walls 131a, 131b, 131c, 131d, and 131e, respectively, each with an outer surface extending from lower surface 114 until reaching horizontal reference plane 120; also, drainage channels 130a, 130b, 130c, 130d, and 130e include outer walls 133a, 133b, 133c, 133d, and 133e, respectively, each with an outer surface extending from horizontal reference plane 120 until outer walls 133a, 133b, 133c, 133d, and 133e reach at least a reference plane (not shown) extending through and coplanar with upper surface 126. In some embodiments, outer walls 133a, 133b, 133c, 133d, and 133e could extend beyond above upper surface 126 and have unequal lengths with inner walls 131a, 131b, 131c, 131d, and 131e, respectively. In some embodiments, outer walls 133a, 133b, 133c, 133d, and 133e could comprise sidewalls 112a, 112b, 112c, 112d, and 112e, respectively, and share the same distal ends 116a, 116b, 116c, 116d, and 116e, respectively.

Upper surface 126 includes a plurality of fastener retainers 132 (shown in isolation in FIGS. 4A and 4B). Each fastener retainer 132 includes fastener vertical guides 134 extending inwardly from an inner surface 137 of aperture 138 in base 124 and upwardly through aperture 138 from lower surface 128 until reaching an opening 140 formed by a plurality of flexible flaps 135. Each fastener retainer 132 includes an outer surface 139 extending upwardly from upper surface 126 until reaching a distal edge 136 of outer surface 139 from which an upper horizontal surface 141 extends inwardly and horizontally until reaching flaps 135 forming opening 140.

In some embodiments, fasteners 102a and 102b may be "pre-positioned" within fastener retainers 132 and held in place solely by flaps 135 prior to housing 110 being positioned for mounting on installation surface 10. In some embodiments, fasteners 102a and 102b may be pro-positioned by a manufacturer of the base prior to being placed into the stream of commerce. A user may insert fastener 102a or 102b into opening and apply a tightening force to drive fastener 102a or 102b downwardly so that threads of fastener 102a or 102b will engage flaps 135 to create a frictional and/or threadable engagement between the threads and flaps 135 as a distal end of fasteners 102a or 102b is guided by vertical guides 134. Should the tightening force be removed before a tip of fastener 102a or 102b prior to reaching aperture 138, fastener 102a or 102b will remain in a statically and held substantially vertical position between vertical guides 134 solely by the frictional engagement, thereby allowing a user to "pre-position" fastener 102a or 102b to avoid having to wait until after housing 110 is placed into position on installation surface 10 for mounting thereto.

Upper surface 126 includes a plurality of forward attachment points 140, a plurality of aft attachment points 142, a plurality of apertures 144a-144c in between forward and aft retainers, respectively, for providing a pass-through of conductor(s) between upper and lower surfaces 126 and 128, and a diverter 146 for diverting any moisture flowing from forward attachment points 140 to prevent contact of the moisture with conductor(s) passing through apertures 144a-144c (the moisture flow provided by diverter 146 is shown in FIG. 5E).

In some embodiments, dimples (not shown) may be included with one or more apertures 144a-144c. Known to those skilled in the art, dimples keep apertures closed, and as such, provide a barrier to an ingress of moisture; if a conductor needs to be passed through upon installation of junction box 100 to the installation surface, the user may simply "punch out" the dimple.

Lower surface 128 includes inner and outer walls 148 and 149, respectively, parallel with each other and extending downwardly from lower surface 128 to form a groove 150 into which a seal 151 may be received to provide a moisture barrier to electrical conductors passing upwardly through apertures 144a-144c. Inner wall 148 could form an inner perimeter of groove 150 to prevent moisture from entering into an inner space formed within the perimeter of the groove after being mounted to the installation surface. In some embodiments, at least outer wall 149 extends downwardly until reaching horizontal reference plane 120. As embodied herein, groove(s) and/or a chemical flashing(s) disclosed by Affentranger, Jr. et al in U.S. Pat. No. 11,152,889 (Affentranger) may be employed herein, a reference incorporated herein in its entirety.

Although inner and outer walls 148 and 149 are shown as continuous walls without gaps, inner and outer walls 148 and 149 need not be continuous in some embodiments; rather, inner and/or outer walls 148 and 149 may be divided into sections as long as they are configured for receiving seal 151.

Lower surface 128 includes a plurality of walls 152 forming cavities into which a user may apply a sealant (such as those in Affentranger) into the cavities formed by walls 152 through which fasteners 102a or 102b extend when housing 110 prior to housing 110 being mounted on installation surface 10. Each fastener wall 152 (i.e., cavity) extends downwardly from lower surface 128. In some embodiments, each fastener wall 152 may be concentric with aperture 138. When housing 110 is mounted on installation surface 10, the sealant may prevent moisture incursion where the fasteners 102a or 102b penetrates the installation surface within fastener wall 152.

Figure 5F:
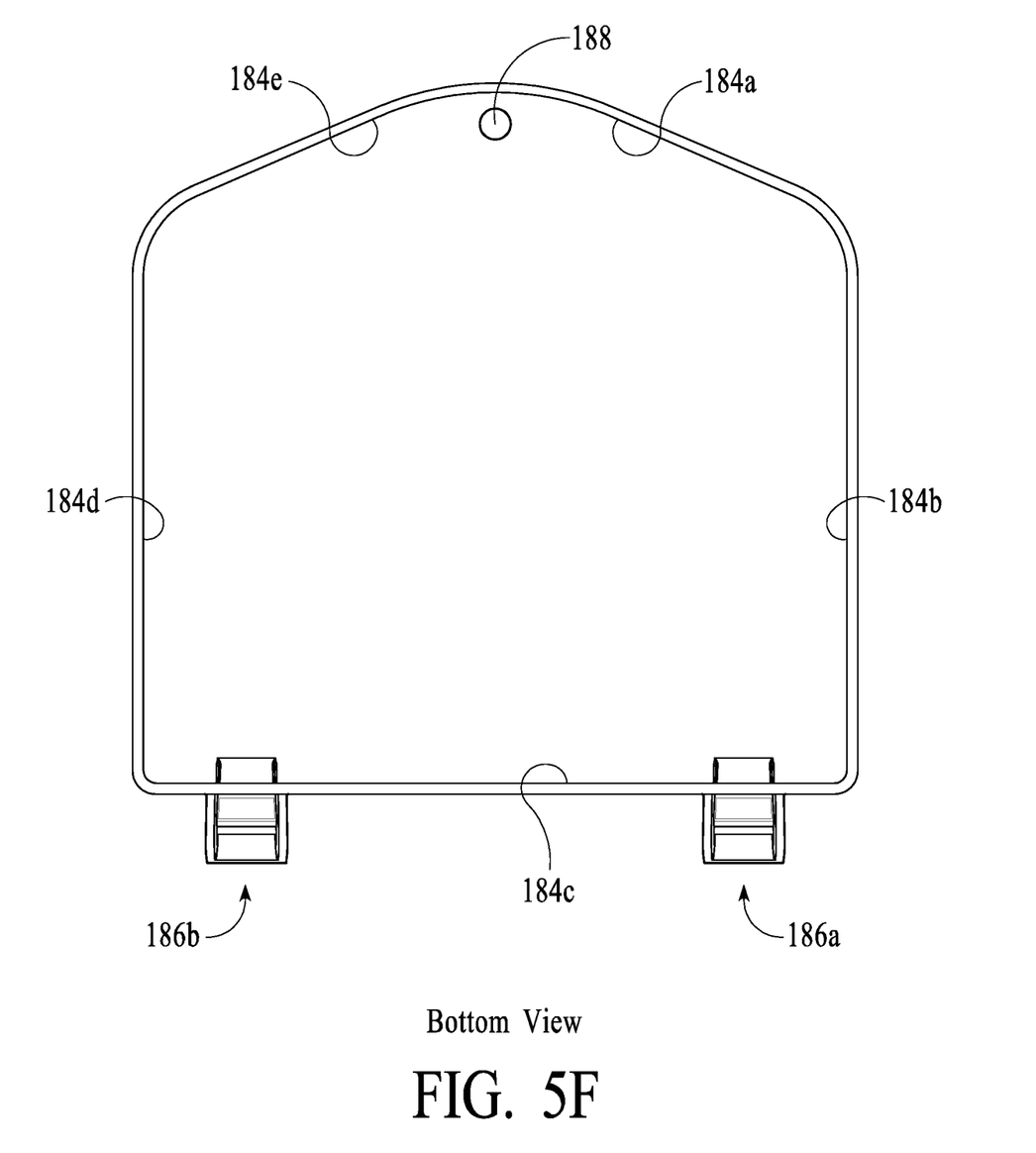
FIG. 5F illustrates a bottom view of a cover of the enclosure assembly, in accordance with some embodiments.

Housing 110 includes hinge brackets 160a and 160b configured to facilitate a pivotable engagements with stationary pins 186a and 186b, respectively, of cover 180 shown in FIG. 5F in between open and closed positions of enclosure assembly 100. When placed into a closed position, sides 184a-184e are positioned outside of sidewalls 112a-112e, respectively, where sides 184a and 184e are also positioned outside of left and right forward sidewalls 112g. When placed into a closed position, aperture 188 is positioned above aperture 114 configured for receiving fastener 182 when securing cover 180 to housing 110.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. An enclosure assembly, comprising:
   a base enclosed by a housing formed by at least one sidewall, where
      the base has an upper surface and an opposing lower surface that is located above and non-coplanar with a horizontal reference plane; and
      the base includes a groove formed by a plurality of walls extending downwardly from the lower surface and configured to receive a seal, such that
         placement of the seal within the groove during a mounting of the base to an installation surface prevents moisture from entering into a space formed within an inner perimeter of the groove after being mounted to the installation surface.

2. The enclosure assembly of claim 1, wherein
   the base further includes a plurality of fastener retainers, where
      each one of the plurality of fastener retainers is configured with a plurality of fastener retainer flaps and a plurality of vertical guides extending upwardly from an aperture located between the upper and lower surfaces, and
      the plurality of fastener retainer flaps is configured to engage threads of a fastener positioned between the plurality of vertical guides, such that
         the plurality of fastener retainer flaps facilitates a prepositioning of the fastener vertically and statically between the plurality of vertical guides prior to the base being positioned on the installation surface for mounting.

3. The enclosure assembly of claim 1, wherein
   the base further includes a plurality of fastener cavities, where
      each one of the plurality of fastener cavities extends downwardly from the lower surface and is configured to receive a sealant prior to the base being mounted to the installation surface, such that
         the sealant prevents moisture incursion where the fastener penetrates the installation surface.

4. The enclosure assembly of claim 1, wherein the base further includes at least one aperture located within the inner perimeter of the groove and configured to facilitate a passing through of at least one conductor between the upper and lower surfaces.

5. The enclosure assembly of claim 4, wherein the base further includes a moisture diverter extending upwardly from the upper surface and configured to divert moisture within the housing outwardly and away from the at least one aperture when a forward end of the housing is mounted on an installation surface above an aft end of the housing.

6. The enclosure assembly of claim 1, wherein
   the base further includes at least one drainage channel, where
      each drainage channel has an inner wall and an outer wall, where
         an outer surface of the inner wall extends outwardly away from the lower surface of the base and downwardly to the horizontal reference plane, and
         an outer surface of the outer wall extends outwardly away from the horizontal reference plane and upwardly until the outer wall reaches at least a reference plane extending through and coplanar with the upper surface of the base.

7. The enclosure assembly of claim 1, wherein flashing extends outwardly from the housing and along the horizontal reference plane.

* * * * *